(12) United States Patent
Matsuo

(10) Patent No.: US 11,110,930 B2
(45) Date of Patent: Sep. 7, 2021

(54) CONTROL DEVICE FOR AUTOMATIC TRANSMISSION

(71) Applicants: JATCO LTD, Fuij (JP); Nissan Motor Co., Ltd., Yokohama (JP)

(72) Inventor: Katsuhiro Matsuo, Kanagawa (JP)

(73) Assignees: Jatco Ltd., Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/970,675

(22) PCT Filed: Feb. 22, 2019

(86) PCT No.: PCT/JP2019/006696
§ 371 (c)(1),
(2) Date: Aug. 18, 2020

(87) PCT Pub. No.: WO2019/167818
PCT Pub. Date: Sep. 6, 2019

(65) Prior Publication Data
US 2020/0377104 A1 Dec. 3, 2020

(30) Foreign Application Priority Data
Feb. 27, 2018 (JP) .............................. JP2018-032872

(51) Int. Cl.
*B60W 30/19* (2012.01)
*B60W 10/06* (2006.01)
(Continued)

(52) U.S. Cl.
CPC ............ *B60W 30/19* (2013.01); *B60W 10/06* (2013.01); *B60W 10/11* (2013.01); *F16H 61/04* (2013.01);
(Continued)

(58) Field of Classification Search
CPC ...... B60W 30/19; B60W 10/06; B60W 10/11; B60W 2710/0666; B60W 2710/1005;
(Continued)

(56) References Cited

U.S. PATENT DOCUMENTS

2009/0319140 A1 12/2009 Sato et al.
2015/0127242 A1* 5/2015 Iizuka ................ F16H 61/0437
701/110

(Continued)

FOREIGN PATENT DOCUMENTS

| JP | S59-126072 A | 7/1984 |
| JP | H10-000964 A | 1/1998 |

(Continued)

*Primary Examiner* — Roger L Pang
(74) *Attorney, Agent, or Firm* — Global IP Counselors, LLP

(57) ABSTRACT

A control device for an automatic transmission includes a traveling drive source, an automatic transmission, an AT controller, and a traveling drive source controller. The AT controller is configured to execute shifting by changeover of friction elements upon receiving a shift request. The traveling drive source controller is configured to execute torque limit control of the traveling drive source when a request for limiting a torque by an upper limit torque is input from the AT controller. The AT controller has an upper limit torque change processing unit configured to change the upper limit torque from a low gear upper limit torque to a high gear upper limit torque when auto-upshift is executed. The upper limit torque change processing unit is configured to raise the upper limit torque using a prescribed gradient during an inertia phase when the inertia phase is started with the auto-upshift.

7 Claims, 7 Drawing Sheets

(51) Int. Cl.
    *B60W 10/11*     (2012.01)
    *F16H 61/04*     (2006.01)
    *F16H 61/684*    (2006.01)
    *F16H 61/682*    (2006.01)

(52) U.S. Cl.
    CPC ... *F16H 61/684* (2013.01); *B60W 2710/0666* (2013.01); *B60W 2710/1005* (2013.01); *F16H 61/682* (2013.01); *F16H 2200/0065* (2013.01)

(58) Field of Classification Search
    CPC .. B60W 10/04; F16H 61/04; F16H 2061/492; F16H 2063/508
    USPC ..................................................... 701/66, 54
    See application file for complete search history.

(56) References Cited

U.S. PATENT DOCUMENTS

2016/0223079 A1* 8/2016 Takahashi ............. F16H 61/702
2018/0194355 A1* 7/2018 Tsuda ....................... B60K 6/48

FOREIGN PATENT DOCUMENTS

| | | | |
|---|---|---|---|
| JP | 2005273468 A | * | 10/2005 |
| JP | 2009-228848 A | | 10/2009 |
| JP | 2010-001953 A | | 1/2010 |

* cited by examiner

ENGAGEMENT CHART

| LEVEL NUMBER | B1 (REV. CLUTCH) | B2 | B3 | K1 | K2 | K3 (FWD. CLUTCH) |
|---|---|---|---|---|---|---|
| 1 | | ● | | | | ● |
| 2 | | ● | ● | | | ● |
| 3 | | ● | ● | | ● | |
| 4 | | ● | ● | ● | | |
| 5 | | | ● | ● | ● | |
| 6 | | | | ● | ● | ● |
| 7 | | | ● | ● | | ● |
| 8 | ● | | ● | ● | | ● |
| 9 | ● | | ● | | | |
| Rev | ● | ● | | | | |
| N, P RANGE | | | | | | |

Fig. 3

CONTROL DEVICE FOR AUTOMATIC TRANSMISSION

This is a U.S. national phase application of PCT/JP2019/006696, filed on Feb. 22, 2019, which claims priority to Japanese Patent Application No. 2018-032872, filed on Feb. 27, 2018. The entire disclosure of Japanese Patent Application No. 2018-032872 is hereby incorporated herein by reference.

TECHNICAL FIELD

The present invention relates to a control device for an automatic transmission mounted in a vehicle, and a control method for an automatic transmission.

BACKGROUND ART

Conventionally, a torque control means is provided for implementing engine torque suppression control during upshift of an automatic transmission. For the torque control means, described are an engine and an automatic transmission integrated control device that limit the engine torque to the value at the time of shift start when the upshift is a power-on upshift (see Japanese Laid-Open Patent Application Publication).

SUMMARY

In the abovementioned conventional device, when the second gear upper limit torque is set higher than the first gear upper limit torque of the engine torque, when starting using an accelerator pressing operation, an auto-upshift is made to be executed from first gear to second gear by an increase in the vehicle speed. In this case, when auto-upshift from first gear to second gear is completed, there is a step-wise rising change in the engine torque from the first gear upper limit torque to second gear upper limit torque at the point when shift is completed, and there was the problem of the occurrence of upthrust shock due to this sudden rise in engine torque.

The present invention was created with a focus on this problem, and its purpose is to suppress the occurrence of upthrust shock while ensuring acceleration performance when auto-upshift is executed by an increase in the vehicle speed.

To achieve this purpose, the present invention changes the upper limit torque from a low gear upper limit torque to a high gear upper limit torque set to a higher torque than the low gear upper limit torque. In more detail, when an inertia phase starts in auto-upshift, the upper limit torque is raised using a prescribed gradient from the low gear upper limit torque to a high gear upper limit torque during the inertia phase.

By connecting to the high gear upper limit torque by gradually raising the upper limit torque during the inertia phase in this way, when auto-upshift is executed by an increase in the vehicle speed, it is possible to suppress the occurrence of upthrust shock while ensuring acceleration performance.

BRIEF DESCRIPTION OF THE DRAWINGS

FIG. 3 is an engagement chart showing the engaged state at each gear level of a friction element for shifting with the automatic transmission to which the control device of Embodiment 1 is applied.

DETAILED DESCRIPTION OF EMBODIMENTS

Figure 1:
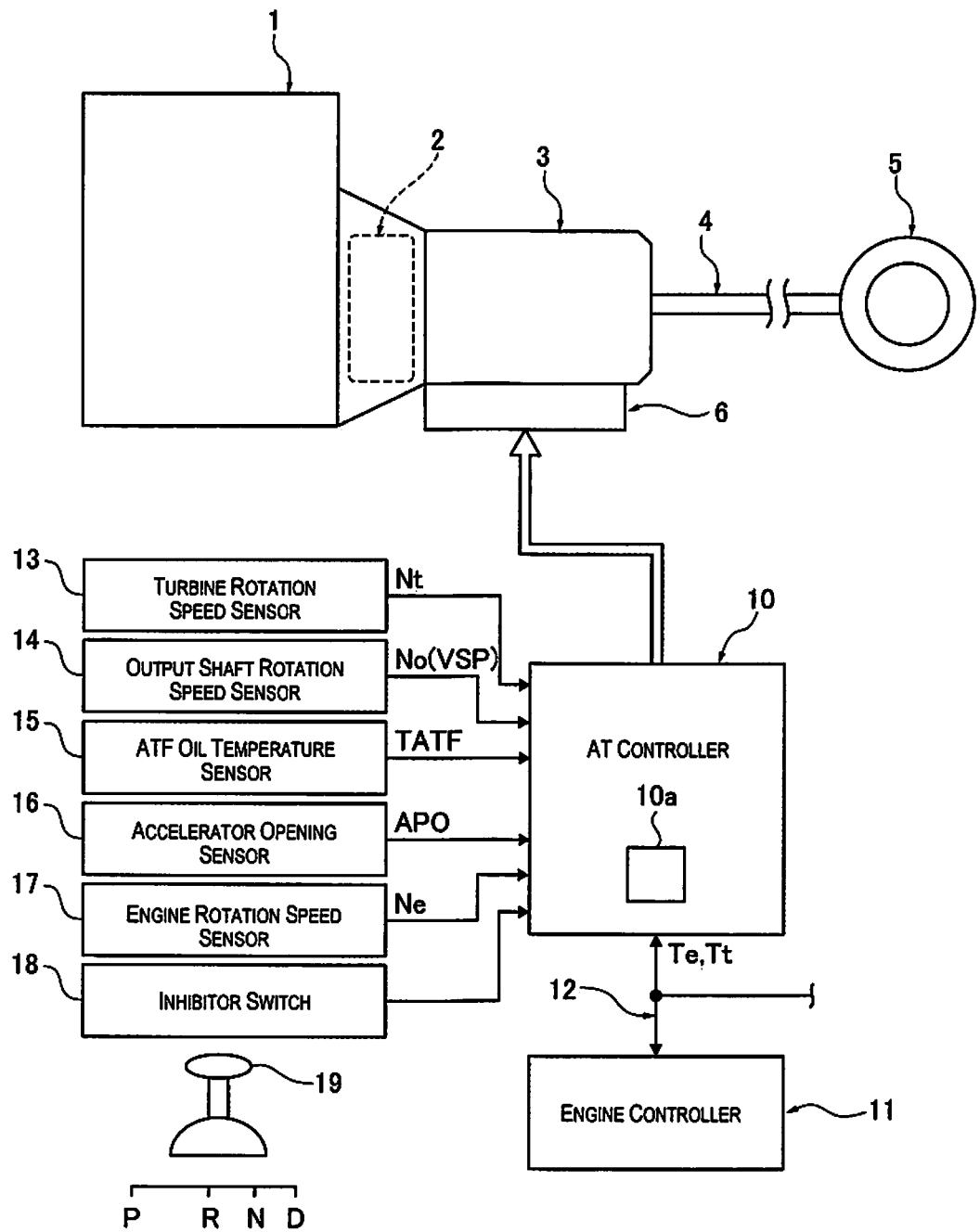
FIG. 1 is an overall system diagram showing an engine car in which is mounted an automatic transmission to which a control device of Embodiment 1 is applied.

Hereafter, a mode for carrying out the control device for an automatic transmission of the present invention is explained based on Embodiment 1 shown in the drawings.

Embodiment 1

An upshift control device of Embodiment 1 is applied to an engine car in which is mounted an automatic transmission having gear levels of nine forward gears and one reverse gear. Hereafter, the configuration of Embodiment 1 is explained divided into "Overall System Configuration," "Detailed Configuration of Automatic Transmission," and "Engine Upper Limit Torque Change Control Process Configuration During 1-2 Auto-upshift."

Overall System Configuration

FIG. 1 shows an engine car in which is mounted an automatic transmission to which is applied the upshift control device of Embodiment 1. Following, the overall system configuration is explained based on FIG. 1.

As shown in FIG. 1, provided in the drive system of the engine car are an engine 1, a torque converter 2, an automatic transmission 3, a propeller shaft 4, and a drive wheel 5. A control valve unit 6 including a spool valve, a hydraulic circuit, a solenoid valve, etc., for shifting is attached to the automatic transmission 3. An actuator provided in this control valve unit 6 operates by receiving a control command from an AT controller 10.

As shown in FIG. 1, a control system of an engine car comprises the AT controller 10, an engine controller 11, and a CAN communication line 12.

The AT controller 10 inputs signals from a turbine rotation speed sensor 13, an output shaft rotation speed sensor 14, an ATF oil temperature sensor 15, an accelerator opening sensor 16, an engine rotation speed sensor 17, an inhibitor switch 18, etc.

The turbine rotation speed sensor 13 detects the turbine rotation speed (=transmission input shaft rotation speed) of the torque converter 2, and sends a turbine rotation speed Nt signal to the AT controller 10. The output shaft rotation speed sensor 14 detects the output shaft rotation speed (=vehicle speed VSP) of the automatic transmission 3, and sends an output shaft rotation speed No (VSP) signal to the AT controller 10. The ATF oil temperature sensor 15 detects the temperature of ATF (oil for automatic transmission), and sends an ATF oil temperature TATF signal to the AT controller 10. The accelerator opening sensor 16 detects the accelerator opening by an accelerator operation of the driver, and sends an accelerator opening APO signal to the AT controller 10. The engine rotation speed sensor 17 detects the rotation speed of the engine 1, and sends an engine rotation speed Ne signal to the AT controller 10. The inhibitor switch 18 detects the range position selected by a select operation by the driver on a select lever 19, a select button, etc., and sends a range position signal to the AT controller 10.

By monitoring changes in operating points (VSP, APO) by the vehicle speed VSP and the accelerator opening APO on a shift map with the AT controller 10, shift control is performed using basic shift patterns called:

1. Auto-upshift (by an increase in the vehicle speed in a state with the accelerator opening maintained)
2. Foot release upshift (by an accelerator foot release operation)
3. Foot return upshift (by an accelerator return operation)
4. Power-on downshift (by a vehicle speed decrease with the accelerator opening maintained)
5. Small opening sudden pressing downshift (by a small accelerator operation amount)
6. Large opening sudden pressing downshift (by a large accelerator operation amount: "kick down")
7. Slow pressing downshift (by a slow accelerator pressing operation and an increase in the vehicle speed)
8. Coast downshift (by a vehicle speed decrease with an accelerator foot release operation)

In the AT controller 10, there is an upper limit torque change processing unit 10a that does change control of the upper limit torque of the engine torque when executing 1-2 auto-upshift in conjunction with an increase in the vehicle speed in a state with the accelerator opening maintained. In the upper limit torque change processing unit 10a, the second gear upper limit torque ($2^{nd}$ upper limit torque) is set higher than the first gear upper limit torque ($1^{st}$ upper limit torque) of the engine torque.

When the inertia phase of the 1-2 auto-upshift starts, the upper limit torque change processing unit 10a raises the upper limit torque from the first gear upper limit torque to the second gear upper limit torque (>first gear upper limit torque) during the inertia phase.

In addition to various controls of the engine alone, the engine controller 11 also performs engine torque limit control, etc., by cooperative control with a shift control, and the AT controller 10 and the engine controller 11 are connected via a CAN communication line 12 capable of bidirectional information exchange. Thus, when a torque information request is input from the AT controller 10, information of an estimated engine torque Te is output to the AT controller 10. Also, when an engine torque limit request by upper limit torque is input from the AT controller 10, engine torque limit control that has the engine torque as the effective torque (torque that limits driver requested torque using the upper limit torque) is executed. For engine torque limit control, there are slow torque limit control that limits engine torque by control that closes a throttle valve, and fast torque limit control that limits engine torque by engine retard control.

Detailed Configuration of Automatic Transmission

Figure 2:
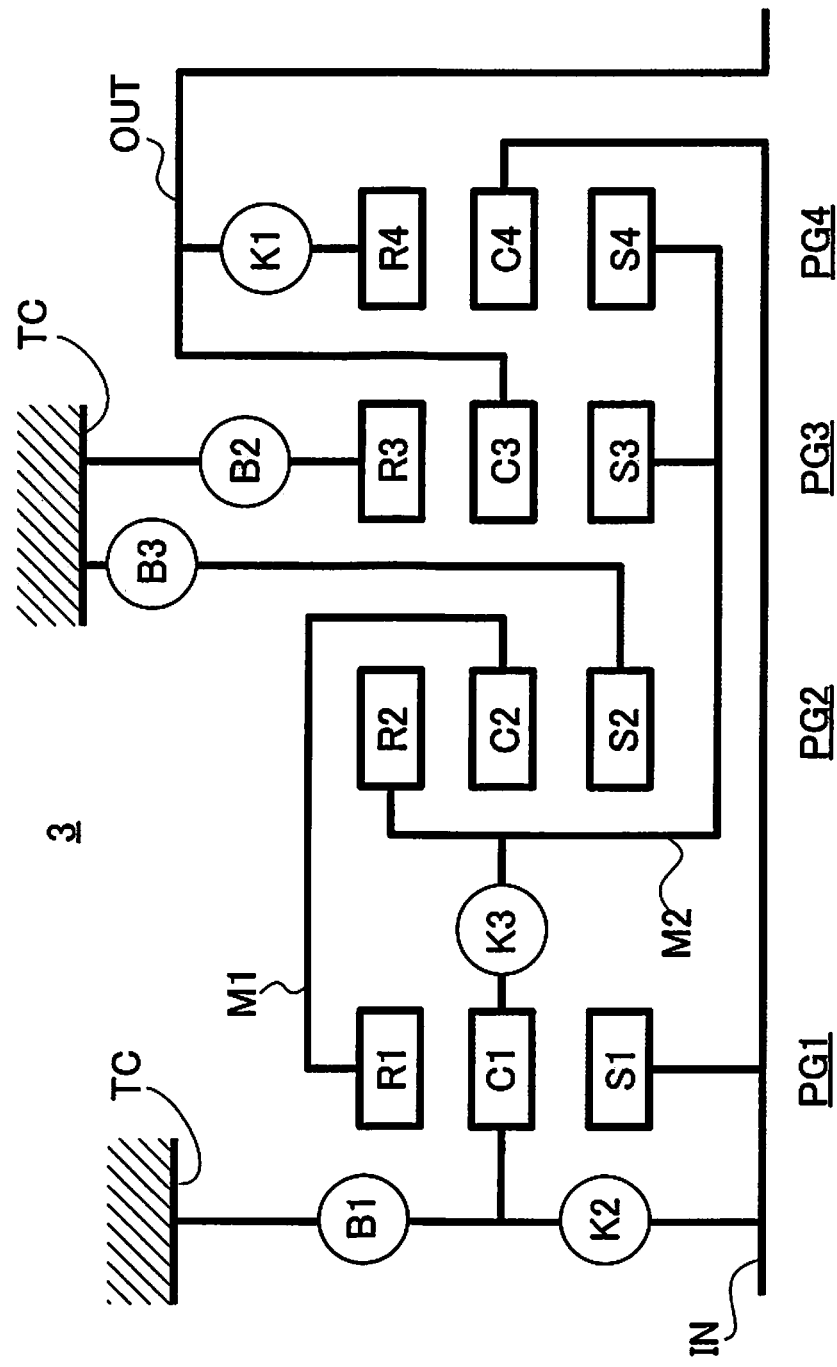
FIG. 2 is a skeleton diagram showing an example of an automatic transmission to which the control device of Embodiment 1 is applied.
Figure 4:
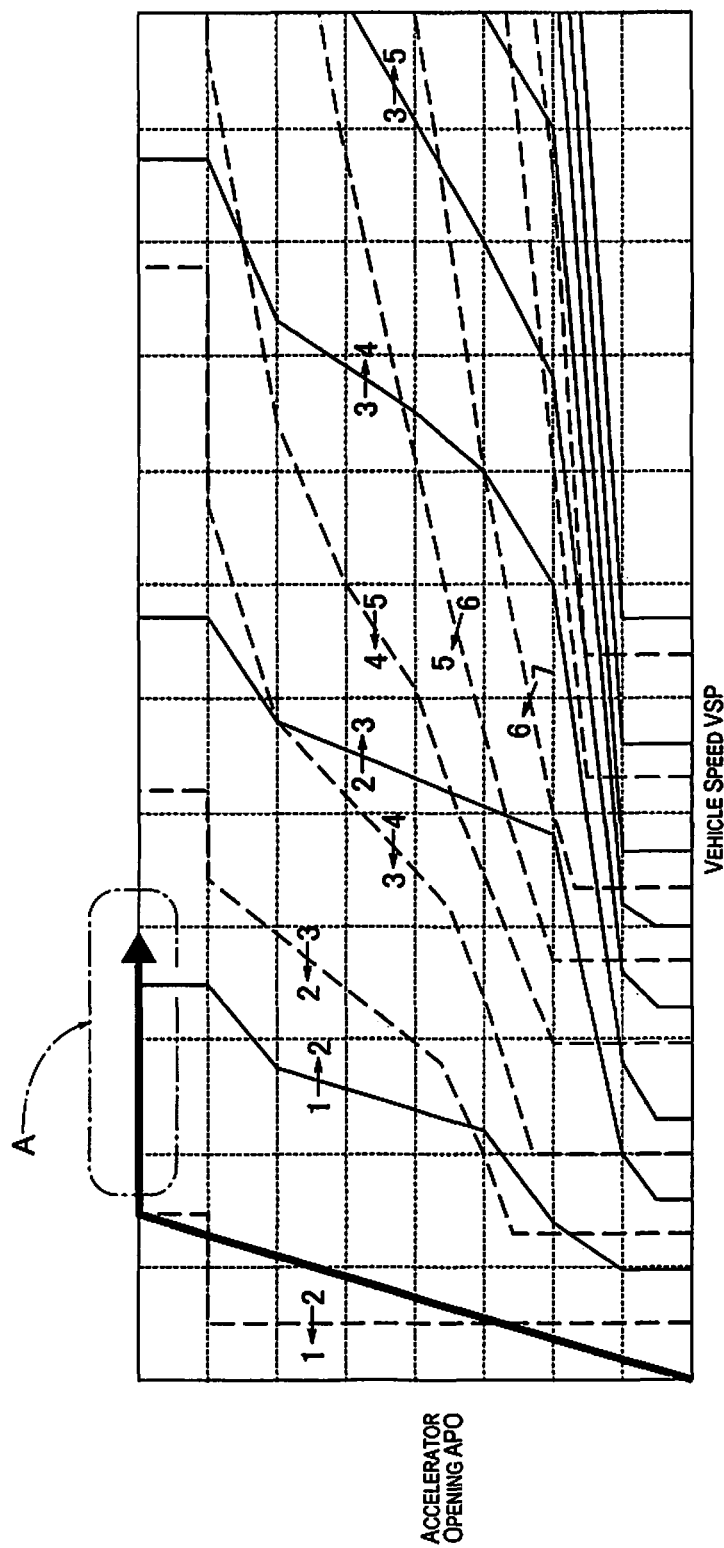
FIG. 4 is a shift map diagram showing an example of a shift map with the automatic transmission to which the control device of Embodiment 1 is applied.

FIG. 2 is a skeleton diagram showing an example of the automatic transmission 3 to which the upshift control device of Embodiment 1 is applied, FIG. 3 is an engagement chart with the automatic transmission 3, and FIG. 4 shows an example of a shift map with the automatic transmission 3. Hereafter, the detailed configuration of the automatic transmission 3 is explained based on FIG. 2 to FIG. 4.

As shown in FIG. 2, the automatic transmission 3 comprises as planetary gears that configure a gear train a first planetary gear PG1, a second planetary gear PG2, a third planetary gear PG3, and a fourth planetary gear PG4 in order from an input shaft IN toward an output shaft OUT.

The first planetary gear PG1 is a single pinion type planetary gear, and has a first sun gear S1, a first carrier C1 that supports a pinion that meshes with the first sun gear S1, and a first ring gear R1 that meshes with the pinion.

The second planetary gear PG2 is a single pinion type planetary gear, and has a second sun gear S2, a second carrier C2 that supports a pinion that meshes with the second sun gear S2, and a second ring gear R2 that meshes with the pinion.

The third planetary gear PG3 is a single pinion type planetary gear, and has a third sun gear S3, a third carrier C3 that supports a pinion that meshes with the third sun gear S3, and a third ring gear R3 that meshes with the pinion.

The fourth planetary gear PG4 is a single pinion type planetary gear, and has a fourth sun gear S4, a fourth carrier C4 that supports a pinion that meshes with the fourth sun gear S4, and a fourth ring gear R4 that meshes with the pinion.

As shown in FIG. 2, the automatic transmission 3 comprises the input shaft IN, the output shaft OUT, a first connection member M1, a second connection member M2, and a transmission case TC. As friction elements that are engaged and released by shifting, provided are a first brake B1, a second brake B2, a third brake B3, a first clutch K1, a second clutch K2, and a third clutch K3.

The input shaft IN is a shaft by which drive force from the engine 1 is input via the torque converter 2, and is always connected to the first sun gear S1 and the fourth carrier C4. Also, the input shaft IN is connected to be disconnectable with the first carrier C1 via the second clutch K2.

The output shaft OUT is a shaft for outputting drive torque shifted to the drive wheel 5 via a propeller shaft 4 and a final gear outside the drawing, etc., and is always connected to the third carrier C3. Also, the output shaft OUT is connected to be able to be disconnectable with the fourth ring gear R4 via the first clutch K1.

The first connection member M1 is a member that always connects the first ring gear R1 of the first planetary gear PG1 and the second carrier C2 of the second planetary gear PG2 without having a friction element interposed. The second connection member M2 is a member that always connects the second ring gear R2 of the second planetary gear PG2, the third sun gear S3 of the third planetary gear PG3, and the fourth sun gear S4 of the fourth planetary gear PG4 without having a friction element interposed.

The first brake B1 is a friction element that can lock the rotation of the first carrier C1 with respect to the transmission case TC. The second brake B2 is a friction element that can lock the rotation of the third ring gear R3 with respect to the transmission case TC. The third brake B3 is a friction element that can lock the rotation of the second sun gear S2 with respect to the transmission case TC.

The first clutch K1 is a friction element that selectively connects between the fourth ring gear R4 and the output shaft OUT. The second clutch K2 is a friction element that selectively connects between the input shaft IN and the first carrier C1. The third clutch K3 is a friction element that selectively connects between the first carrier C1 and the second connection member M2.

FIG. 3 shows an engagement chart that achieves nine forward gears and one reverse gear in the D range by a combination of simultaneous engagement of three of the six friction elements in the automatic transmission 3. Hereafter, a shift configuration that establishes each gear level is explained based on FIG. 3.

First gear ($1^{st}$) is achieved by simultaneous engagement of the second brake B2, the third brake B3, and the clutch K3. Second gear ($2^{nd}$) is achieved by simultaneous engagement of the second brake B2, the second clutch K2, and the third clutch K3. Third gear ($3^{rd}$) is achieved by simultaneous engagement of the second brake B2, the third brake B3, and the second clutch K2. Fourth gear ($4^{th}$) is achieved by simultaneous engagement of the second brake B2, the third brake B3, and the first clutch K1. Fifth gear ($5^{th}$) is achieved by simultaneous engagement of the third brake B3, the first clutch K1, and the second clutch K2. The first gear to fifth gear above are underdrive gear levels using a reduction gear ratio for which the gear ratio exceeds 1.

Sixth gear ($6^{th}$) is achieved by simultaneous engagement of the first clutch K1, the second clutch K2, and the third clutch K3. This sixth gear is a direct coupling stage of gear ratio=1.

Seventh gear ($7^{th}$) is achieved by simultaneous engagement of the third brake B3, the first clutch K1, and the third clutch K3. Eighth gear ($8^{th}$) is achieved by simultaneous engagement of the first brake B1, the first clutch K1, and the third clutch K3. Ninth gear ($9^{th}$) is achieved by simultaneous engagement of the first brake B1, the third brake B3, and the first clutch K1. Seventh gear to ninth gear above are overdrive gear levels using a speed increasing gear ratio for which the gear ratio is less than 1.

Furthermore, of the gear levels from first gear to ninth gear, when performing an upshift to an adjacent gear level, or when performing a downshift, as shown in FIG. 3, the configuration is made to perform this using a changeover shift. Specifically, the shift to an adjacent gear level is achieved by performing releasing of one friction element and engaging of one friction element while maintaining engagement of two friction elements of the three friction elements.

The reverse gear (Rev) by selecting the R range position is achieved by simultaneously engaging the first brake B1, the second brake B2, and the third brake B3. When the N range position and the P range position are selected, the six friction elements B1, B2, B3, K1, K2, and K3 are all in a released state.

Also, a shift map like that shown in FIG. 4 is stored and set in the AT controller 10, and shifting by switching the gear level from first gear to ninth gear on the forward side by selecting the D range is performed according to this shift map. Specifically, when an upshift line shown by the solid line in FIG. 4 is crossed by the operating points (VSP, APO) at that time, an upshift shift request is output. Also, when the downshift line shown by the dotted line in FIG. 4 is crossed by the operating points (VSP, APO), a downshift shift request is output.

In the following explanation, as shift patterns, as shown by the characteristics within the frame of arrow A in FIG. 4, after a pressing start from a vehicle stopped state, this is handled as a "1-2 auto-upshift" for which a 1-2 upshift is executed with crossing of the 1-2 upshift line by the vehicle speed VSP rising with the accelerator opening APO kept as is in the full open range. In the case of 1-2 auto-upshift by crossover from first gear→second gear, the second clutch K2 is an "engaged clutch" that moves from a released state to an engaged state, and the third brake B3 is a "released clutch" that moves from the engaged state to the released state.

Upper Limit Torque Change Control Process Configuration During 1-2 Auto-Upshift

Figure 5:
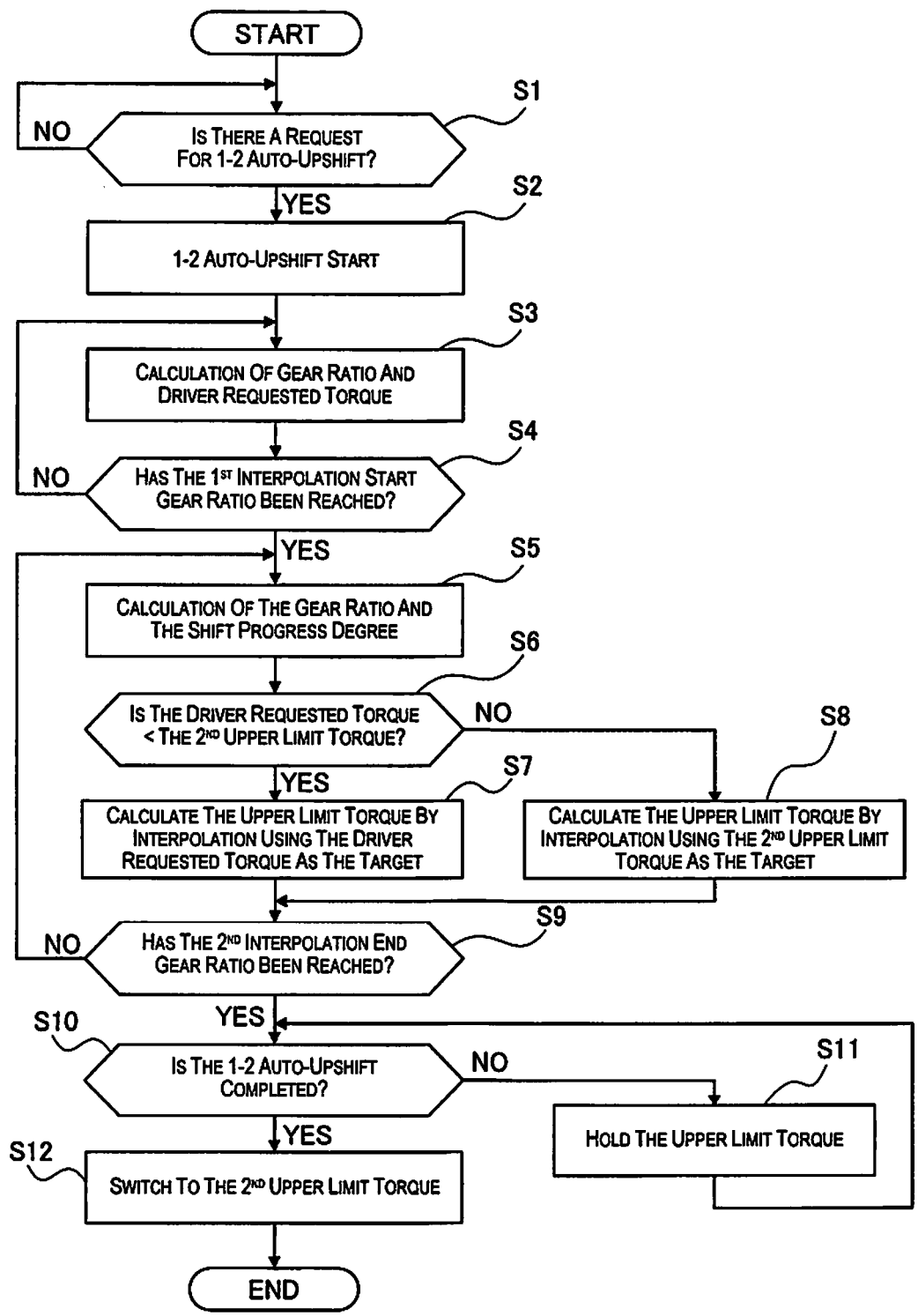
FIG. 5 is a flow chart showing the flow of the upper limit torque change control process during 1-2 auto-upshift executed by an AT controller of Embodiment 1.

FIG. 5 is a flow chart showing the flow of the upper limit torque change control process during 1-2 auto-upshift executed by the AT controller 10 of Embodiment 1. Hereafter, each step of FIG. 5 showing the upper limit torque change control process configuration during 1-2 auto-upshift is explained.

With step S1, when doing an acceleration start in the accelerator full open range from the vehicle stopped state, a determination is made of whether there is a 1-2 auto-upshift request. When YES (there is a 1-2 auto-upshift request), the process advances to step S2, and when NO (there is no 1-2 auto-upshift request), the determination of step S1 is repeated.

At step S2, following the determination that there is a 1-2 auto-upshift request at step S1, the 1-2 auto-upshift that shifts from first gear to second gear starts, and the process advances to step S3.

Here, when the 1-2 auto-upshift starts, output of an engagement hydraulic pressure command to the second clutch K2 in the released state is started, and output of a release hydraulic pressure command to the third brake B3 in the engaged state is started.

At step S3, following the start of the 1-2 auto-upshift of step S2, or alternatively, the determination that the $1^{st}$ interpolation start gear ratio of step S4 has not been reached, the gear ratio and the driver requested torque are calculated, and the process advances to step S4.

Here, the "gear ratio" is calculated by the rotation speed ratio using the turbine rotation speed Nt (=transmission input shaft rotation speed) from the turbine rotation speed sensor 13 and the output shaft rotation speed No (=transmission output shaft rotation speed) of the output shaft rotation speed sensor 14. The "driver requested torque" is calculated by the size of the accelerator opening APO from the accelerator opening sensor 16 and the vehicle speed VSP from the output shaft rotation speed sensor 14.

At step S4, following the calculation of the gear ratio and the driver requested torque at step S3, a determination is made of whether the gear ratio of the automatic transmission 3 has reached the $1^{st}$ interpolation start gear ratio. When YES ($1^{st}$ interpolation start gear ratio reached), the process advances to step S5, and when NO ($1^{st}$ interpolation start gear ratio not reached), the process returns to step S3.

Here, the "$1^{st}$ interpolation start gear ratio" is the gear ratio that starts the torque interpolation calculation of the $1^{st}$ upper limit torque and the $2^{nd}$ upper limit torque, and is set to a gear ratio that is offset slightly more to the second gear ratio side than the first gear ratio. In other words, since the sensor detection values from the rotation speed sensors 13, 14 include an error, etc., this is an inertia phase start gear ratio by sensor detection with the effect of the error, etc., eliminated. Thus, the timing of reaching the $1^{st}$ interpolation start gear ratio becomes timing that is slightly delayed from the inertia phase start timing at which change of the gear ratio actually starts (see FIG. 7).

At step S5, following the determination that the $1^{st}$ interpolation start gear ratio has been reached at step S4, or alternatively, determination that the $2^{nd}$ interpolation end gear ratio has not been reached at step S9, the gear ratio and the shift progress degree are calculated, and the process advances to step S6.

Here, "shift progress degree" means the degree of shift progress during the inertia phase when shifting from first gear to second gear. In other words, if the shift progress degree when the upshift has progressed from the $1^{st}$ interpolation start gear ratio to the $2^{nd}$ interpolation end gear ratio is 100%, the shift progress degree when the calculated gear ratio is an intermediate gear ratio of the $1^{st}$ interpolation start gear ratio and the $2^{nd}$ interpolation end gear ratio is 50%. Also, when calculating the shift progress degree, when the gear ratio calculated this time is a higher gear ratio than the previously calculated gear ratio, the gear ratio calculated this time is used, and when the gear ratio calculated this time is a lower gear ratio than the previously calculated gear ratio, the previously calculated gear ratio is used. In other words, the shift progress degree is made not to return.

At step S6, following the calculation of the gear ratio and the shift progress degree at step S5, a determination is made of whether the driver requested torque calculated at step S3 is less than the $2^{nd}$ upper limit torque. When YES (driver requested torque<$2^{nd}$ upper limit torque), the process advances to step S7, and when NO (driver requested torque≥$2^{nd}$ upper limit torque), the process advances to step S8.

Figure 7:
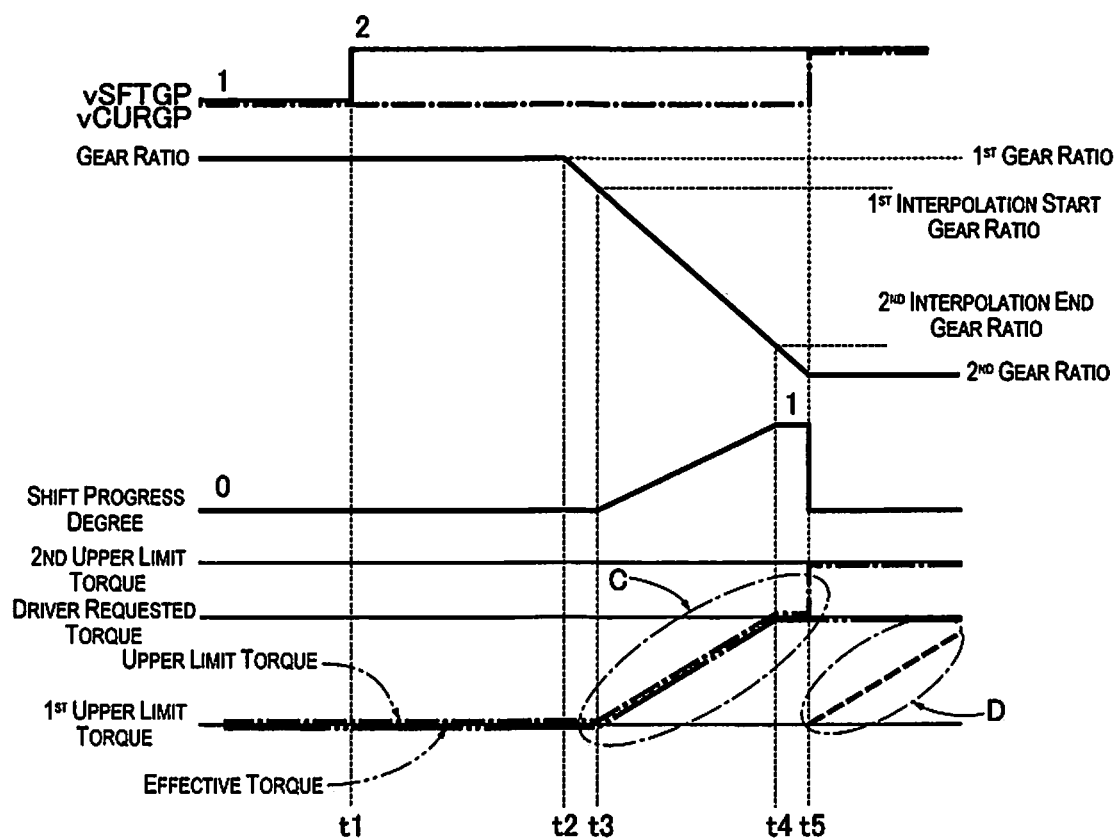
FIG. 7 is a time chart showing each characteristic of the shift instruction, gear ratio, first upper limit torque, second upper limit torque, driver requested torque, upper limit torque, and effective torque with upper limit torque change control during 1-2 auto-upshift executed by the upper limit torque change processing unit of the AT controller of Embodiment 1.

Here, the "$2^{nd}$ upper limit torque" is the upper limit torque of the second gear, and is set in advance to a torque value higher than the $1^{st}$ upper limit torque which is the upper limit torque of the first gear (see FIG. 7).

At step S7, following a determination that the driver requested torque<$2^{nd}$ upper limit torque at step S6, the driver requested torque is used as the target upper limit torque with the $2^{nd}$ interpolation end gear ratio, and the upper limit torque is calculated by torque interpolation calculation using the $1^{st}$ upper limit torque, the driver requested torque, and the shift progress degree, and the process advances to step S9.

Here, with the "torque interpolation calculation" of step S7, when torque deviation width ΔT1 of a driver requested torque Td and a $1^{st}$ upper limit torque TL1 is 100%, a shift progress torque difference ΔTN (=ΔT1×N/100) is calculated by shift progress degree N %. Also, the value for which the shift progress torque difference ΔTN is added to the $1^{st}$ upper limit torque T1 is calculated as an upper limit torque Tlim.

At step S8, following the determination that the driver requested torque>$2^{nd}$ upper limit torque at step S6, using the $2^{nd}$ upper limit torque as the target upper limit torque with the $2^{nd}$ interpolation end gear ratio, the upper limit torque is calculated by the torque interpolation calculation using the $1^{st}$ upper limit torque, the $2^{nd}$ upper limit torque, and the shift progress degree, and the process advances to step S9.

Here, with the "torque interpolation calculation" of step S8, when a torque deviation width ΔT2 of the $2^{nd}$ upper limit torque TL2 and the $1^{st}$ upper limit torque TL1 is 100%, the shift progress torque difference ΔTN (=ΔT2×N/100) is calculated using shift progress degree N %. Also, the value for which the shift progress torque difference ΔTN is added to the $1^{st}$ upper limit torque TL1 is calculated as the upper limit torque Tlim.

At step S9, following the calculation of the upper limit torque at step S7 or step S8, a determination is made of whether the calculated gear ratio reached the $2^{nd}$ interpolation end gear ratio. When YES (the $2^{nd}$ interpolation end gear ratio was reached), the process advances to step S10, and when NO (the $2^{nd}$ interpolation end gear ratio was not reached), the process returns to step S5.

Here, the "$2^{nd}$ interpolation end gear ratio" is a gear ratio that ends the torque interpolation calculation of the $1^{st}$ upper limit torque and the $2^{nd}$ upper limit torque, and is set to a gear ratio offset slightly more to the first gear ratio side than the second gear ratio. In other words, the sensor detection values from the rotation speed sensors 13, 14 include errors, etc., so the inertia phase end gear ratio is according to sensor detection for which the effect of the error, etc., is eliminated. Thus, the timing at which the $2^{nd}$ interpolation end gear ratio is reached is the timing slightly before the timing at which the gear ratio actually reaches the second gear ratio (see FIG. 7).

At step S10, a determination is made of whether the $2^{nd}$ interpolation end gear ratio of step S9 has been reached, or alternatively, a determination is made of whether the 1-2 auto-upshift is completed following holding of the upper limit torque at step S11. When YES (1-2 auto-upshift completed), the process advances to step S12, and when NO (1-2 auto-upshift not completed), the process advances step S11.

Here, "1-2 auto-upshift completed" means the timing at which the engagement hydraulic pressure command to the second clutch K2 is the maximum command value, and the release hydraulic pressure command to the third brake B3 is zero.

At step S11, following the determination that the 1-2 auto-upshift is not completed at step S10, the upper limit torque output at that time is held, and the process returns to step S10.

Here, the "upper limit torque is held" means, for example, that when the upper limit torque output when the gear ratio has reached the $2^{nd}$ interpolation end gear ratio is the driver requested torque, the driver requested torque is held (see FIG. 7).

At step S12, following the determination that the 1-2 auto-upshift is completed at step S10, the upper limit torque is switched to the $2^{nd}$ upper limit torque, and the process advances to the end.

Here, when the upper limit torque has already risen to the $2^{nd}$ upper limit torque, the $2^{nd}$ upper limit torque is maintained, and when the upper limit torque has risen to the driver requested torque, a switch is made from the driver requested torque to the $2^{nd}$ upper limit torque.

Next, the operation of Embodiment 1 is explained divided into "Upper Limit Torque Change Control Process Operation During 1-2 Auto-upshift," and "Comparison Action of Upper Limit Torque Change Control."

Upper Limit Torque Change Control Process Operation During 1-2 Auto-Upshift

Following, the upper limit torque change control process operation during 1-2 auto-upshift is explained based on the flowchart of FIG. 5.

When doing acceleration start in the accelerator full open range from the vehicle stopped state, when there is a 1-2 auto-upshift request, in the flow chart of FIG. 5, the process advances from step S1 to step S2→S3→S4, and the 1-2 auto-upshift starts at step S2. During the time it is determined that the $1^{st}$ interpolation start gear ratio has not been reached with step S4, the flow of advancing from step S3→S4 is repeated. At step S3, the driver requested torque is calculated based on the gear ratio after 1-2 auto-upshift start, and mainly the accelerator opening APO.

When it is determined that the $1^{st}$ interpolation start gear ratio has been reached at step S4, the process advances from step S4-step S5→S6, and at step S5, the gear ratio and the shift progress degree after the $1^{st}$ interpolation start gear ratio is reached are calculated. At step S6, a determination is made of whether the driver requested torque calculated at step S3 is less than the $2^{nd}$ upper limit torque.

When it is determined that the driver requested torque<$2^{nd}$ upper limit torque at step S6, the process advances from step S6 to step S7→step S9. At step S7, the driver requested torque is used as the target upper limit torque with the $2^{nd}$ interpolation end gear ratio, and the upper limit torque is calculated by the torque interpolation calculation using the $1^{st}$ upper limit torque, the driver requested torque, and the shift progress degree. In other words, when the torque deviation width $\Delta T1$ of the driver requested torque Td and the $1^{st}$ upper limit torque TL1 is set as 100%, the shift progress torque difference $\Delta TN$ ($=\Delta T1 \times N/100$) is calculated using shift progress degree N %, and the value for which the shift progress torque difference $\Delta TN$ is added to the $1^{st}$ upper limit torque TL1 is used as the upper limit torque Tlim.

When it is determined that the driver requested torque≥the $2^{nd}$ upper limit torque at step S6, the process advances from step S6 to step S8→step S9. At step S8, using the $2^{nd}$ upper limit torque as the target upper limit torque with the $2^{nd}$ interpolation end gear ratio, the upper limit torque is calculated by torque interpolation calculation using the $1^{st}$ upper limit torque, the $2^{nd}$ upper limit torque, and the shift progress degree. In other words, when the torque deviation width $\Delta T2$ of the $2^{nd}$ upper limit torque TL2 and the $1^{st}$ upper limit torque TL1 is set as 100%, the shift progress torque difference $\Delta TN$ ($=\Delta TN \times N/100$) is calculated using shift progress degree N %, and the value for which the shift progress torque difference $\Delta TN$ is added to the $1^{st}$ upper limit torque TL1 is used as the upper limit torque Tlim.

At step S9, following the calculation of the upper limit torque at step S7 or step S8, a determination is made of whether the calculated gear ratio has reached the $2^{nd}$ interpolation end gear ratio. Also, during the time it is determined that the $2^{nd}$ interpolation end gear ratio has not been reached (during the inertia phase), the flow of advancing from step S5 to step S9 is repeated, and the upper limit torque is calculated by the torque interpolation calculation using the shift progress degree.

Also, when it is determined that the $2^{nd}$ interpolation end gear ratio has been reached, the process advances from step S9 to step S10, and during the time it is determined that the 1-2 auto-upshift has not been completed at step S10, the flow that advances from step S10→step S11 is repeated. At step S11, the upper limit torque that is output at that time is held. Thereafter, when it is determined that the 1-2 auto-upshift is complete at step S10, the process advances from step S10 to step S12→the end. At step S12, the upper limit torque is switched to the $2^{nd}$ upper limit torque.

In this way, with the upper limit torque change control process during 1-2 auto-upshift, when the $1^{st}$ interpolation start gear ratio is reached, during the time until the $2^{nd}$ interpolation end gear ratio is reached, the upper limit torque is calculated by the torque interpolation calculation using the shift progress degree. Also, for the torque interpolation calculation using the shift progress degree, when it is determined that the driver requested torque<the $2^{nd}$ upper limit torque, the torque interpolation calculation has the driver requested torque set as the target upper limit torque with the $2^{nd}$ interpolation end gear ratio. On the other hand, when it is determined that the driver requested torque≥the $2^{nd}$ upper limit torque, the torque interpolation calculation has the $2^{nd}$ upper limit torque set as the target upper limit torque with the $2^{nd}$ interpolation end gear ratio.

Comparison Action of Upper Limit Torque Change Control

Figure 6:
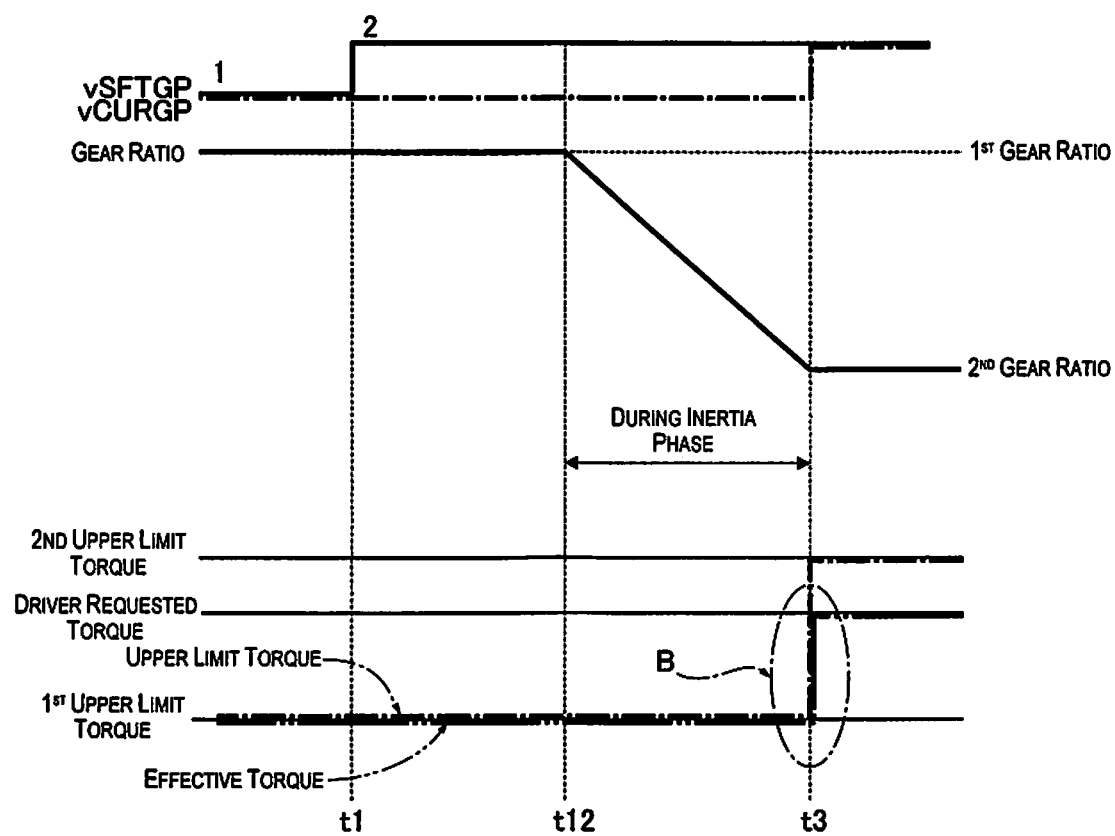
FIG. 6 is a time chart that shows each characteristic of the shift instruction, gear ratio, first upper limit torque, second upper limit torque, driver requested torque, upper limit torque, and effective torque with upper limit torque change control during 1-2 auto-upshift executed by the AT controller of a comparison example.

FIG. 6 is a time chart showing each characteristic with upper limit torque change control during 1-2 auto-upshift executed using the AT controller of a comparison example.

With the comparison example, when starting using an accelerator pressing operation, when auto-upshift from first gear to second gear is executed by an increase in the vehicle speed, the upper limit torque at the shift completion time switches from the $1^{st}$ upper limit torque to the $2^{nd}$ upper limit torque.

Time t1 is the start time of 1-2 auto-upshift, time t2 is the inertia phase start time with 1-2 auto-upshift, and time t3 is the 1-2 auto-upshift completion time.

With the comparison example, in the preparation interval of the 1-2 auto-upshift from time t1 to time t2, the upper limit torque is the $1^{st}$ upper limit torque, and the effective torque is also the $1^{st}$ upper limit torque. In the inertia phase interval from time t2 to time t3, following the preparation interval, the upper limit torque is the $1^{st}$ upper limit torque, and the effective torque is also the $1^{st}$ upper limit torque. Also, when the 1-2 auto-upshift completion time t3 is reached, the upper limit torque is switched from the $1^{st}$ upper limit torque (e.g. approximately 400 Nm) to the $2^{nd}$ upper limit torque (e.g. approximately 700 Nm).

For this reason, as shown by the characteristics within the frame of arrow B, when the 1-2 auto-upshift completion time t3 is reached, the effective torque rises and changes in stepwise fashion from the $1^{st}$ upper limit torque to the driver requested torque. With this sudden rise in the effective torque, upthrust shock occurs after 1-2 auto-upshift completion.

In other words, there is demand for gently switching the upper limit torque so as to suppress the occurrence of upthrust shock. There is a proposal that when this upper limit torque is switched gently, after the 1-2 auto-upshift is completed, raising from the $1^{st}$ upper limit torque to the $2^{nd}$ upper limit torque be done at a prescribed rise gradient. However, when switching gently after the 1-2 auto-upshift is completed, it takes time for the effective torque to rise to the driver requested torque, and this brings on decreased start acceleration performance due to insufficient drive force.

The present invention was created with a focus on the problem of wanting to suppress upthrust shock while ensuring start acceleration performance, and is applied to a configuration that raises the upper limit torque from the $1^{st}$ upper limit torque to the second upper limit torque using a prescribed gradient during the inertia phase when the inertia phase is started with 1-2 auto-upshift.

FIG. 7 is a time chart showing each characteristic with upper limit torque change control during 1-2 auto-upshift executed by the upper limit torque change processing unit 10a of the AT controller 10 of Embodiment 1.

Time t1 is the start time of 1-2 auto-upshift, time t2 is the inertia phase start time with 1-2 auto-upshift, time t3 is the $1^{st}$ interpolation start gear ratio reached time, time t4 is the $2^{nd}$ interpolation end gear ratio reached time, and time t5 is the 1-2 auto-upshift completion time.

With Embodiment 1, in the preparation interval of the 1-2 auto-upshift from time t1 to time t2, the upper limit torque is the $1^{st}$ upper limit torque, and the effective torque is also the $1^{st}$ upper limit torque. In the inertia phase start interval from time t2 to time t3, following the preparation interval, the upper limit torque is the $1^{st}$ upper limit torque, and the effective torque is also the $1^{st}$ upper limit torque.

Also, when the $1^{st}$ interpolation start gear ratio reached time t3 is reached, during the inertia phase until the $2^{nd}$ interpolation end gear ratio reached time t4, the upper limit torque has the driver requested torque as the target upper limit, and switches to the characteristic of the torque rising by a rise gradient according to the shift progress degree from the $1^{st}$ upper limit torque to the driver requested torque.

When the $2^{nd}$ interpolation end gear ratio reached time t4 is reached, the upper limit torque is held as is as the driver requested torque until the 1-2 auto-upshift completion time t5, and when the 1-2 auto-upshift completion time t5 is reached, this is switched to the $2^{nd}$ upper limit torque.

For this reason, as shown by the characteristics within the frame of arrow C, during the inertia phase from the $1^{st}$ interpolation start gear ratio reached time t3 until the $2^{nd}$ interpolation end gear ratio reached time t4, the effective torque rises and changes gently from the $1^{st}$ upper limit torque to the driver requested torque. By this gentle rising change of the effective torque, the occurrence of upthrust shock after 1-2 auto-upshift completion is prevented.

In addition, before reaching the 1-2 auto-upshift completion time t5, the effective torque is made to be raised up to the driver requested torque. For this reason, as shown by the characteristics within the frame of arrow D, after the 1-2 auto-upshift completion time t5 is reached, compared to when the effective torque is raised up to the driver requested torque, the start acceleration performance is improved.

In this way, by gradually raising the upper limit torque during the inertia phase and connecting to the $2^{nd}$ upper limit torque, when the 1-2 auto-upshift by an increase in the vehicle speed is executed, it is possible to suppress the occurrence of upthrust shock while ensuring start acceleration performance.

As described above, the effects cited hereafter can be obtained with the control device of the automatic transmission 3 of Embodiment 1.

(1) Comprised are: the traveling drive source (engine 1); the automatic transmission 3 that is connected to the traveling drive source, and that has a plurality of gear levels and a plurality of friction elements; the AT controller 10 that executes shifting by changeover of the friction element when there is a shift request; and a traveling drive source controller (engine controller 11) that executes torque limit control of the traveling drive source (engine 1) when a torque limit request by upper limit torque is input from the AT controller 10. The AT controller 10 has the upper limit torque change processing unit 10a that changes the upper limit torque from the low gear upper limit torque ($1^{st}$ upper limit torque) to the high gear upper limit torque ($2^{nd}$ upper limit torque) set to be a higher torque than the low gear upper limit torque when the auto-upshift (1-2 auto-upshift) that shifts from low gear (first gear) to high gear (second gear) is executed in conjunction with an increase in the vehicle speed. When the inertia phase is started with auto-upshift (1-2 auto-upshift), the upper limit torque change processing unit 10a raises the upper limit torque from the low gear upper limit torque ($1^{st}$ upper limit torque) to the high gear upper limit torque ($2^{nd}$ upper limit torque) during the inertia phase using a prescribed gradient. For this reason, when the auto-upshift (1-2 auto-upshift) is executed by an increase in the vehicle speed, it is possible to suppress the occurrence of upthrust shock while ensuring acceleration performance.

(2) The upper limit torque change processing unit 10a calculates the shift progress degree by the time change of the gear ratio from the low-gear gear ratio (first gear ratio) to the high-gear gear ratio (second gear ratio) when the inertia phase starts with auto-upshift (1-2 auto-upshift). The rise gradient of the upper limit torque is determined by the torque interpolation calculation that raises the torque from the low gear upper limit torque ($1^{st}$ upper limit torque) according to the shift progress degree. For this reason, the rise gradient of the upper limit torque during the inertia phase is according to the shift progress degree of auto-upshift (1-2 auto-upshift), and the effective torque determined by the upper limit torque can undergo optimal change with a sense of incongruity suppressed.

(3) When calculating the shift progress degree based on the gear ratio calculated for a fixed time interval, the upper limit torque change processing unit 10a uses the gear ratio calculated this time when the gear ratio calculated this time is a higher gear ratio than the gear ratio calculated the previous time, and uses the gear ratio calculated the previous time when the gear ratio calculated this time is a lower gear ratio than the gear ratio calculated the previous time. For this reason, when doing auto-upshift (1-2 auto-upshift), it is possible to suppress returning of the shift progress degree when the gear ratio returns to the downshift side, and possible to prevent a decrease in the upper limit torque (=effective torque) during the inertia phase.

(4) The upper limit torque change processing unit 10a calculates the driver requested torque during auto-upshift (during 1-2 auto-upshift). When it is determined that the driver requested torque is smaller than the high gear upper limit torque ($2^{nd}$ upper limit torque), the driver requested torque is used as the target upper limit torque at the inertia phase end. The upper limit torque is determined by the torque interpolation calculation based on the torque deviation width of the low gear upper limit torque ($1^{st}$ upper limit torque) and the driver requested torque, and the shift progress degree. For this reason, when the driver requested torque is smaller than the high gear upper limit torque ($2^{nd}$ upper limit torque), it is possible to raise to the driver requested torque that becomes the effective torque at the inertia phase end while suppressing the torque rise gradient during the inertia phase.

(5) When it is determined that the driver requested torque is the high gear upper limit torque ($2^{nd}$ upper limit torque) or greater, the upper limit torque change processing unit 10a uses the high gear upper limit torque ($2^{nd}$ upper limit torque) as the target upper limit torque at the inertia phase end. The upper limit torque is determined by torque interpolation calculation based on the torque deviation width of the low gear upper limit torque ($1^{st}$ upper limit torque) and the high gear upper limit torque ($2^{nd}$ upper limit torque), and the shift progress degree. For this reason, when the driver requested torque is the high gear upper limit torque ($2^{nd}$ upper limit torque) or greater, it is possible to raise to the high gear upper limit torque ($2^{nd}$ upper limit torque) by a smooth rise change of the upper limit torque without the occurrence of torque steps.

(6) When the shift of the auto-shift (1-2 auto-shift) is completed, the upper limit torque change processing unit 10a switches the upper limit torque to the high gear upper limit torque ($2^{nd}$ upper limit torque). For this reason, at the timing of the shift of auto-upshift (1-2 auto-upshift) being completed and moving to high gear (second gear), it is possible to reliably switch to the high gear upper limit torque ($2^{nd}$ upper limit torque).

Above, the control device for an automatic transmission of the present invention was explained based on Embodiment 1. However, the specific configuration is not limited to this Embodiment 1, and modifications, additions, etc., to the design are permitted provided they do not stray from the gist of the present invention for each claim in the scope of patent claims.

With Embodiment 1, shown is an example of 1-2 auto-upshift when doing acceleration start in the accelerator full open range from the vehicle stopped state. However, during driving travel by accelerator pressing, this is auto-upshift accompanying an increase in the vehicle speed, and if this is a travel scene of auto-upshift for which the high gear upper limit torque is set to a higher torque than the low gear upper limit torque, it is also possible to apply this in cases of auto-upshift in cases other than 1-2 auto-upshift.

With Embodiment 1, as the upper limit torque change processing unit 10a, when the inertia phase with the 1-2 auto-upshift is started, the shift progress degree from the first gear ratio to the second gear ratio is calculated. This shift progress degree is calculated by the gear ratio time change of the gear ratio that changes from the first gear ratio to the second gear ratio together with the lapse of time. For the rise gradient of the upper limit torque, shown is an example determined by torque interpolation calculation that raises the torque from the $1^{st}$ upper limit torque according to the shift progress degree. However, as the upper limit torque change processing unit, an example is also included of raising the upper limit torque using a rise gradient determined in advance without using the shift progress degree.

With Embodiment 1, as the upper limit torque change processing unit 10a, the driver requested torque during 1-2 auto-upshift is calculated. Also, an example is shown with a determination made of whether the driver requested torque is smaller than the $2^{nd}$ upper limit torque, and having a different target upper limit torque when the driver requested torque<the $2^{nd}$ upper limit torque, and when the driver requested torque a the $2^{nd}$ upper limit torque. However, as the upper limit torque change processing unit, for example, it is also acceptable to have an example that uses the $2^{nd}$ upper limit torque as the target upper limit torque without regard to the driver requested torque.

With Embodiment 1, as the automatic transmission, an example was shown of the automatic transmission 3 with nine forward gears and one reverse gear. However, as the automatic transmission, it is also possible to use an example of an automatic transmission having stepped gear levels other than nine forward gears and one reverse gear. Also, with Embodiment 1, shown was an example of the control device for an automatic transmission mounted in an engine car, but this is not limited to an engine car, and can also be applied as the control device for an automatic transmission of a hybrid car or an electric vehicle, etc.

The invention claimed is:

1. A control device for an automatic transmission, comprising:
    a traveling drive source;
    an automatic transmission that is connected to the traveling drive source, and that has a plurality of gear levels and a plurality of friction elements;
    an AT controller configured to execute shifting by changeover of the friction elements upon receiving a shift request; and
    a traveling drive source controller configured to execute torque limit control of the traveling drive source when a request for limiting a torque by an upper limit torque is input from the AT controller, wherein
    the AT controller has an upper limit torque change processing unit configured to change the upper limit torque from a low gear upper limit torque to a high gear upper limit torque that is set to a higher torque than the low gear upper limit torque when auto-upshift that shifts from a low gear to a high gear is executed in conjunction with an increase in a vehicle speed, and
    the upper limit torque change processing unit is configured to raise the upper limit torque using a prescribed gradient from the low gear upper limit torque to the high gear upper limit torque during an inertia phase when the inertia phase is started with the auto-upshift.

2. The control device for an automatic transmission according to claim 1, wherein
    the upper limit torque change processing unit is configured to calculate a shift progress degree by time change of a gear ratio from a low-gear gear ratio to a high-gear gear ratio when the inertia phase with the auto-upshift is started, and
    the prescribed gradient of the upper limit torque is determined by a torque interpolation calculation for which the torque is raised from the low gear upper limit torque according to the shift progress degree.

3. The control device for an automatic transmission according to claim 2, wherein
    the upper limit torque change processing unit, when calculating the shift progress degree based on a gear ratio calculated for a fixed time interval, is configured to use a currently-calculated gear ratio when the currently-calculated gear ratio is a higher gear ratio than a previously-calculated gear ratio, and to use the previously-calculated gear ratio when the currently-calculated gear ratio is a lower gear ratio than the previously-calculated gear ratio.

4. The control device for an automatic transmission according to claim 2, wherein
    the upper limit torque change processing unit is configured to calculate a driver requested torque during the auto-upshift,
    when the driver requested torque is determined to be smaller than the high gear upper limit torque, the upper limit torque change processing unit is configured to use the driver requested torque as a target upper limit torque at an end of the inertia phase, and
    the upper limit torque change processing unit is configured to determine the upper limit torque by torque interpolation calculation based on a torque deviation width of the low gear upper limit torque and the driver requested torque, and the shift progress degree.

5. The control device for an automatic transmission according to claim 4, wherein
    the upper limit torque change processing unit is configured to use the high gear upper limit torque as the target upper limit torque at the end of the inertia phase when the driver requested torque is determined to be the high gear upper limit torque or greater, and
    the upper limit torque change processing unit is configured to determine the upper limit torque by a torque interpolation calculation based on the torque deviation width of the low gear upper limit torque and the high gear upper limit torque, and the shift progress degree.

6. The control device for an automatic transmission according to claim 1, wherein the upper limit torque change processing unit is configured to switch the upper limit torque to the high gear upper limit torque when shifting with the auto-upshift is completed.

7. A control method of an automatic transmission having a plurality of gear levels and a plurality of friction elements, the control method comprising:
- when executing auto-upshift that shifts a gear level of the automatic transmission from a low gear to a high gear by changeover of the friction elements in conjunction with an increase in a vehicle speed, and when an inertia phase is started with the auto-upshift,
- raising an upper limit torque of a traveling drive source, to which the automatic transmission is connected, using a prescribed gradient from a low gear upper limit torque to a high gear upper limit torque set to a higher torque than the low gear upper limit torque during the inertia phase.

\* \* \* \* \*